United States Patent
Willacy et al.

(10) Patent No.: US 6,806,600 B2
(45) Date of Patent: Oct. 19, 2004

(54) ACTUATOR APPARATUS INCLUDING A MARKER DEVICE

(75) Inventors: Steven J Willacy, Telford (GB); David S Mitchell, Market Drayton (GB)

(73) Assignee: Lucas Industries Limited (GB)

( * ) Notice: Subject to any disclaimer, the term of this patent is extended or adjusted under 35 U.S.C. 154(b) by 210 days.

(21) Appl. No.: 10/120,088

(22) Filed: Apr. 10, 2002

(65) Prior Publication Data

US 2003/0067229 A1 Apr. 10, 2003

(30) Foreign Application Priority Data

Oct. 4, 2001 (GB) .............................................. 0109038

(51) Int. Cl.⁷ .............................................. H02K 11/00
(52) U.S. Cl. ..................................... 310/68 B; 310/12
(58) Field of Search ......................... 310/68 B, 12–15, 310/83, 99, 116

(56) References Cited

U.S. PATENT DOCUMENTS 3,825,182 A * 7/1974 Bauchmann ................ 236/1 C
4,482,847 A * 11/1984 Rudich et al. ................ 318/9
6,703,742 B1 * 3/2004 Brandley et al. ...... 310/156.32

* cited by examiner

*Primary Examiner*—Thanh Lam
(74) *Attorney, Agent, or Firm*—Andrus, Sceales, Starke & Sawall, LLP (57) ABSTRACT

An actuator apparatus comprising an actuator member, an actuated element movable by actuation of said actuator member, and a marker device including a marker the position of which can be sensed in use by sensor means, said marker device being secured to said actuator member such that deformation of the actuator member during actuation to move said element causes an adjustment to the change in position of the marker.

6 Claims, 7 Drawing Sheets

ACTUATOR APPARATUS INCLUDING A MARKER DEVICE

The present invention relates to an actuator apparatus including a marker device.

Mechanical actuators are known which use a closed loop control system wherein a position sensor provides a signal indicative of a position of a component being moved by the actuator. For example, in some aerospace applications, such mechanical actuators, powered by electric motors, are used to move nozzles. In an ideal situation the position sensor would be sited at, or close to, the nozzle so that load induced deformations (e.g. bending) of the mechanical components of the actuator would not affect the sensed position. In practice, a hostile environment (high temperatures, vibration etc.) in the vicinity of the nozzle means that it is not practical to locate the position sensor at, or close to, the nozzle. Therefore, the position sensor is located on a component of the motor or actuator remote from the nozzle.

However, problems may arise if the stiffness of actuator components is reduced, which is desirable for saving weight and production costs. It has been found that the force required to move a nozzle can be large enough to cause a significant elastic deformation of the actuator, resulting in an error in the indicated position of the nozzle.

In accordance with the invention, there is provided an actuator apparatus comprising an actuator member, an actuated element movable by actuation of said actuator member, and a marker device including a marker the position of which can be sensed in use by sensor means, said marker device being secured to said actuator member such that deformation of the actuator member during actuation to move said element causes an adjustment to the change in position of the marker.

Such apparatus facilitates more accurate estimation of the position of the actuated element.

Preferably, the actuator member comprises an actuator arm having a longitudinal axis, the marker device being secured to the actuator member such that deformation of the actuator arm causes a displacement of the marker device laterally of the longitudinal axis of the actuator arm.

Preferably, the actuator apparatus includes sensor means for sensing the change in position of the marker.

The sensor means may include indicator means for providing an indication of a change of position of said marker.

Desirably said marker device is secured to said actuator member such that said adjustment to the change in position of the marker compensates for the deformation of the actuator member and also for deformation of other members of the apparatus.

Such an arrangement of the marker device gives rise to position indication based on an apparent high stiffness of the actuator components, so facilitating the use of less stiff actuator components resulting in lighter weight components and lower material costs, whilst providing an accurate indication of the position of the actuated element.

Conveniently, the sensor means comprises a potentiometer and the marker is drivingly connected to a wiper of the potentiometer.

An embodiment of the invention will be described by way of example with reference to the accompanying drawings in which.

Figure 1A:
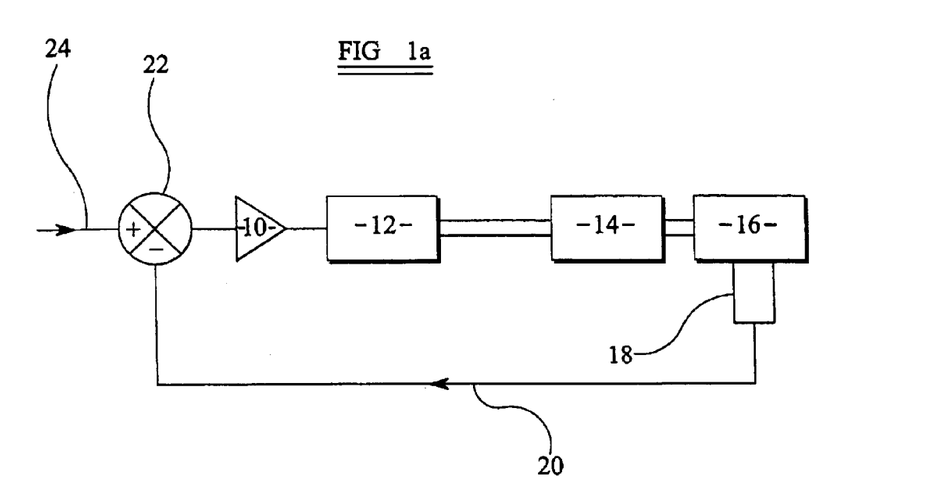
FIGS. 1a and 1b are schematic control system diagrams for control of an actuator.

FIG. 1a shows an ideal situation for a closed loop position feedback in an actuator drive control system. A power drive 10 drives a motor 12 to move an actuator 14 to position, for example, a nozzle 16. A position sensor 18 senses the position of the nozzle 16 and provides a feedback signal 20 to a comparator 22. Comparator 22 compares the indicated nozzle position with a desired demand signal 24 and controls the drive 10 accordingly.

Figure 1B:
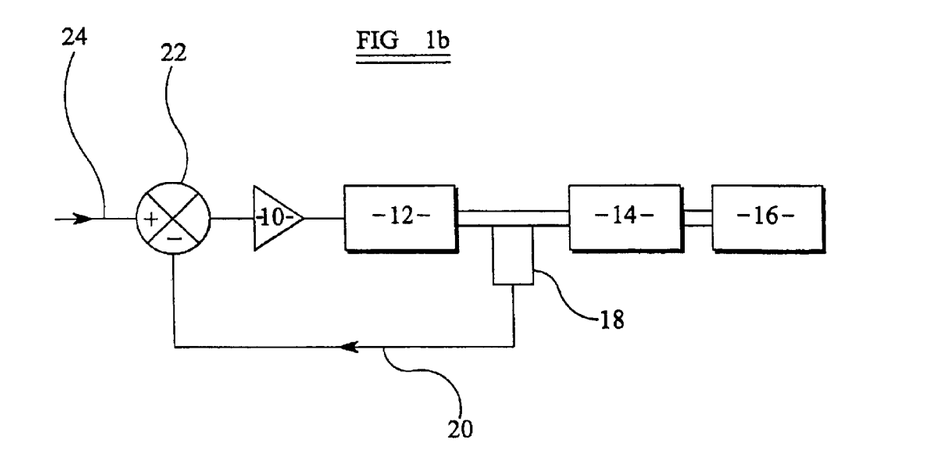

A hostile environment (high temperatures, vibration etc.) in the vicinity of the nozzle means that it is not practical to locate position sensor 18 at the nozzle 16. Therefore, actuator drives may employ the control system shown in FIG. 1b. Here the position sensor 18 is located on a component of the motor 12 or actuator 14 remote from the nozzle 16. In such circumstances an accurate indication of the position of the nozzle 16 relies on the stiffness of the mechanical components of the actuator 14.

Figure 2:
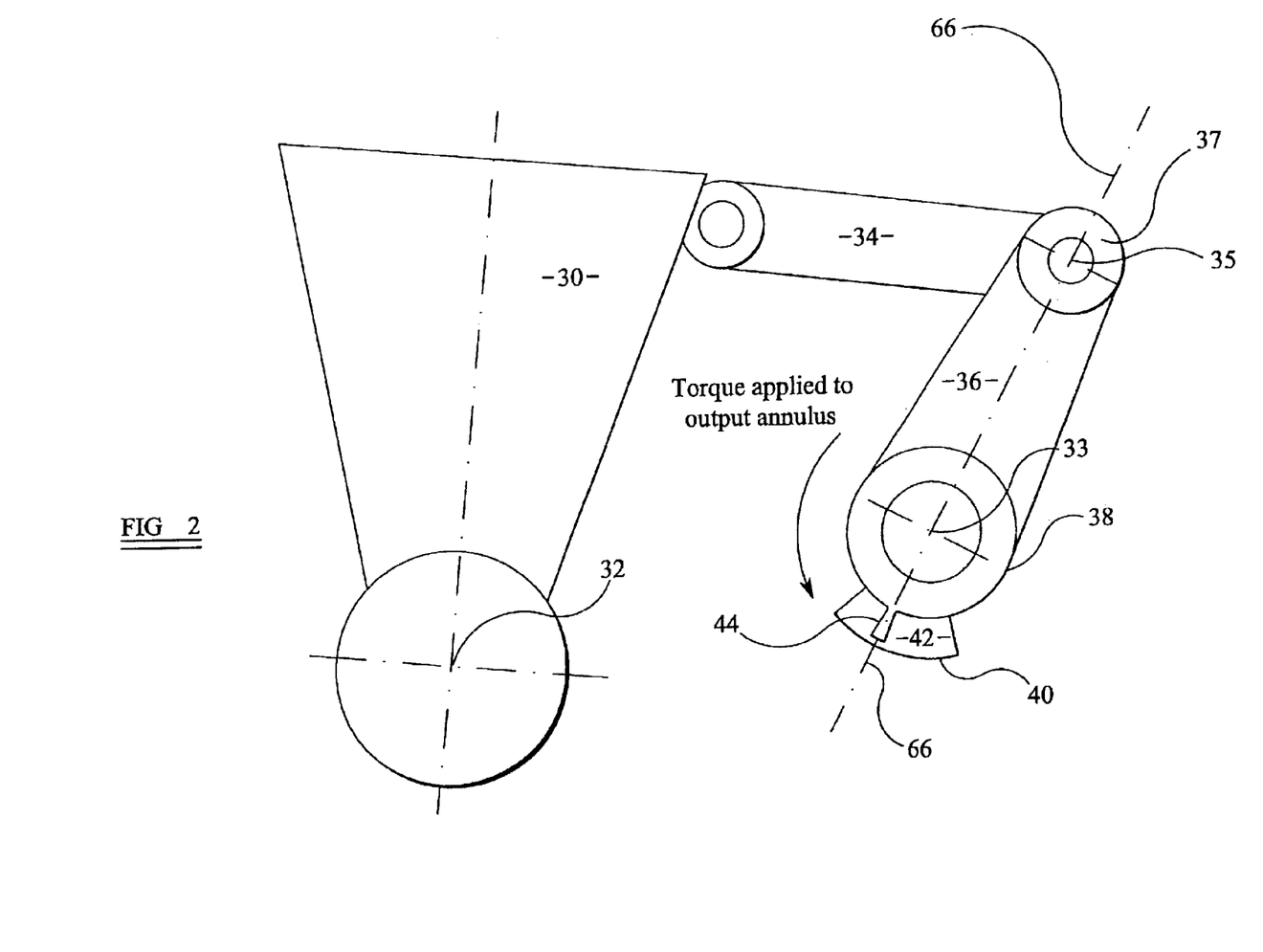
FIG. 2 is a diagram showing an arrangement of a known thrust vector actuator arrangement.

Referring to FIG. 2, an angular position of an actuated element in the form of a nozzle 30 is changeable with respect to a pivot point 32 of the nozzle 30 by an actuator mechanism comprising a link 34 and an actuator member in the form of a link arm 36. Actuator member 36 is coupled at one end 37 thereof to the link 34 by means of a pinned coupling 35, and engages at an opposite, drive end 38 thereof an output drive shaft of a motor or output shaft of a gearbox (not shown). Sensor means in the form of a position sensor 40 comprises a potentiometer having a track 42 and a wiper 44 attached to the actuator member 36.

In use, torque is applied to the actuator member 36 by the motor so as to rotate the actuator member 36 about the axis 33 of the motor or gearbox output drive shaft. The angular position of the actuator member 36 is sensed by the relative positions of the wiper 44 and the track 42 of the position sensor 40. The position sensor 40 provides an indication of the position of the end 37 of the actuator member 36.

It has been found, for example in aerospace applications, that the force required to move a nozzle may be large enough to cause a significant deformation of actuator components and a resulting error in the actual position of the nozzle compared with the demanded position. In particular, in the system shown in FIG. 2, the actuator member 36 may bend. Increasing the flexural stiffness of the actuator so as to reduce deformation leads to an increase in weight or restriction of angular travel, which may be undesirable.

Figure 3A:
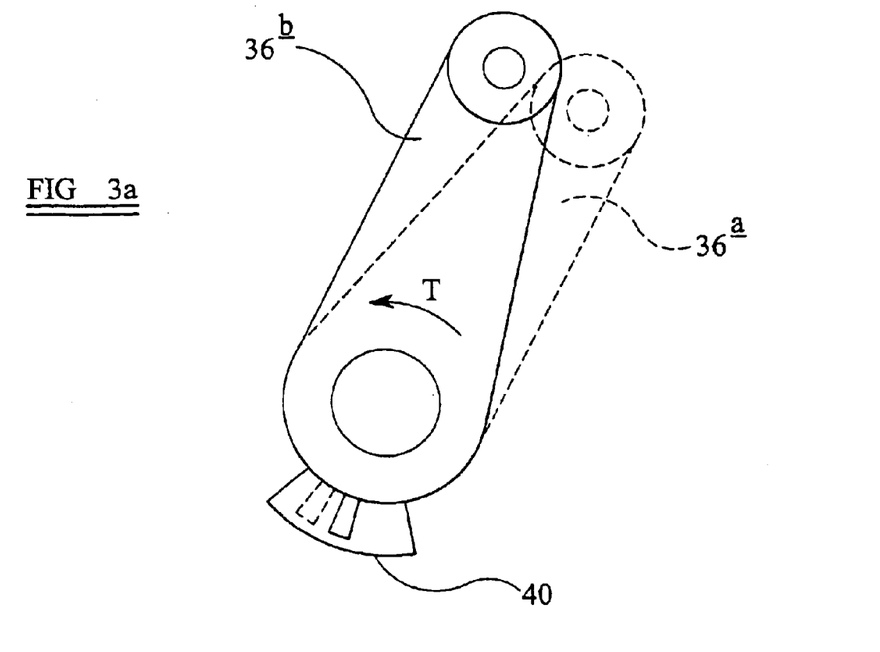
FIGS. 3a and 3b respectively illustrate the behaviour of stiff and less stiff actuator arms during actuation of the known actuator arrangement of FIG. 2.
Figure 3B:
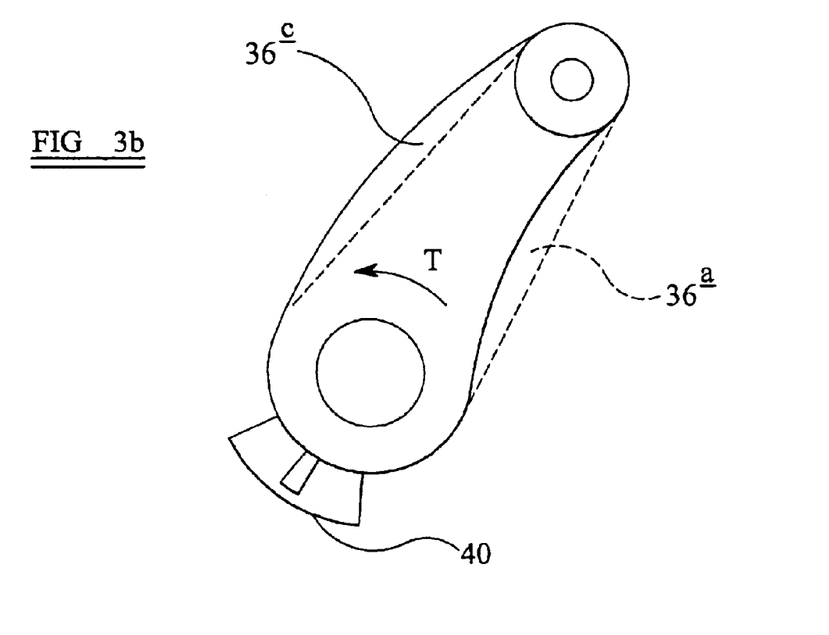

The consequences of bending of the actuator member 36 can be seen in FIGS. 3a and 3b. FIG. 3a shows an idealised situation where the actuator member 36 is infinitely stiff. A first position 36a is indicated by broken lines and a second position 36b, to which the actuator member 36 has moved under the application of torque in the direction of arrow T, is indicated by the solid lines of the actuator member 36.

FIG. 3b shows a situation where actuator member 36 has a finite stiffness. The first position 36a is again indicated by broken lines. In position 36c the actuator member 36 is shown bending, caused by a reaction force from the nozzle 30 due to resistance of the nozzle 30 to movement. The amount of bending is shown in exaggerated form in FIG. 3b. The position indicated by the position sensor 40 in FIG. 3b, when the actuator member is in position 36c, is the same as that in FIG. 3a, when the actuator member is in position 36b. However, the nozzle 30 has actually not moved as far as in FIG. 3a, and the nozzle 30 is in the same position as it would be for an infinitely stiff actuator member in position 36a.

Figure 4A:
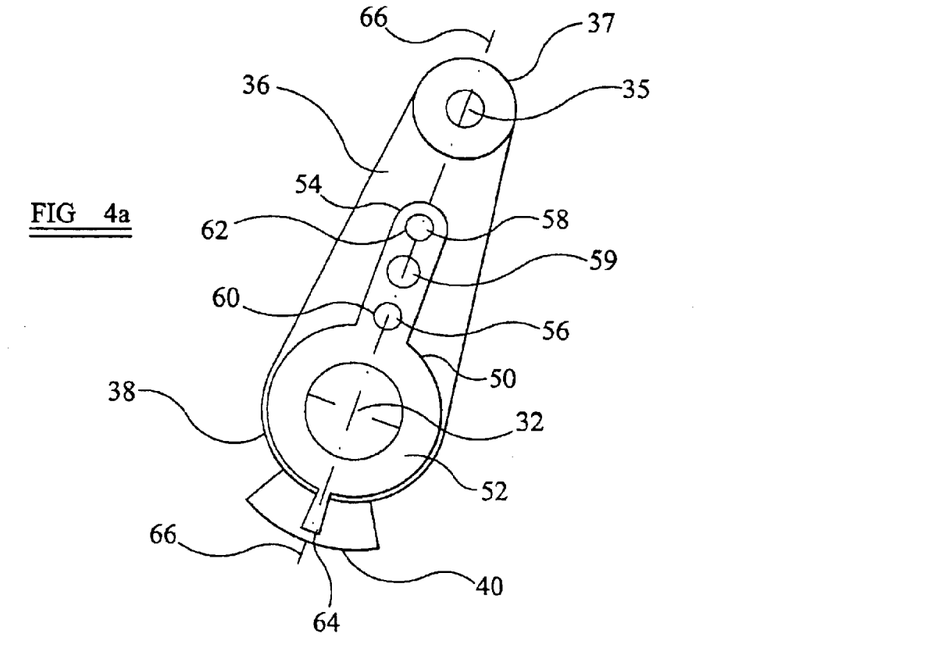
FIGS. 4a and 4b show respective undeformed and deformed conditions of an actuator arm of an apparatus having a marker device.

Referring to FIG. 4a, actuator member 36 is fitted with a marker device 50 comprising an annular portion 52 and an elongate portion 54. The annular portion 52 may be a steel ring with an integral slender arm forming the elongate portion 54. Location means in the form of a pair of dowel pins 56, 58 is rigidly fixed to the actuator member 36. The pins 56, 58 pass through holes 60, 62 in the elongate portion 54 so as to locate the marker device 50 with respect to the actuator member 36. Retainer means in the form of a screw 59 passes through a clearance fit hole 63a (visible only in FIG. 4b) in the marker device 50 and engages in a threaded hole (not shown, but visible in FIG. 7) in the actuator member 36 to prevent the marker device 50 from lifting away from the actuator arm 36. An end portion 64 forms a marker and extends from the annular portion 52 of the marker device 50. End portion 64 engages the wiper 44 of the position sensor 40 so as to drive the wiper 44 when the marker device moves. In the undeformed state of the actuator member 36 shown in FIG. 4a, the dowel pins 56, 58 are in alignment with an axis 66 passing through a centre of the pinned coupling 35 and the pivot point 32.

Figure 4B:
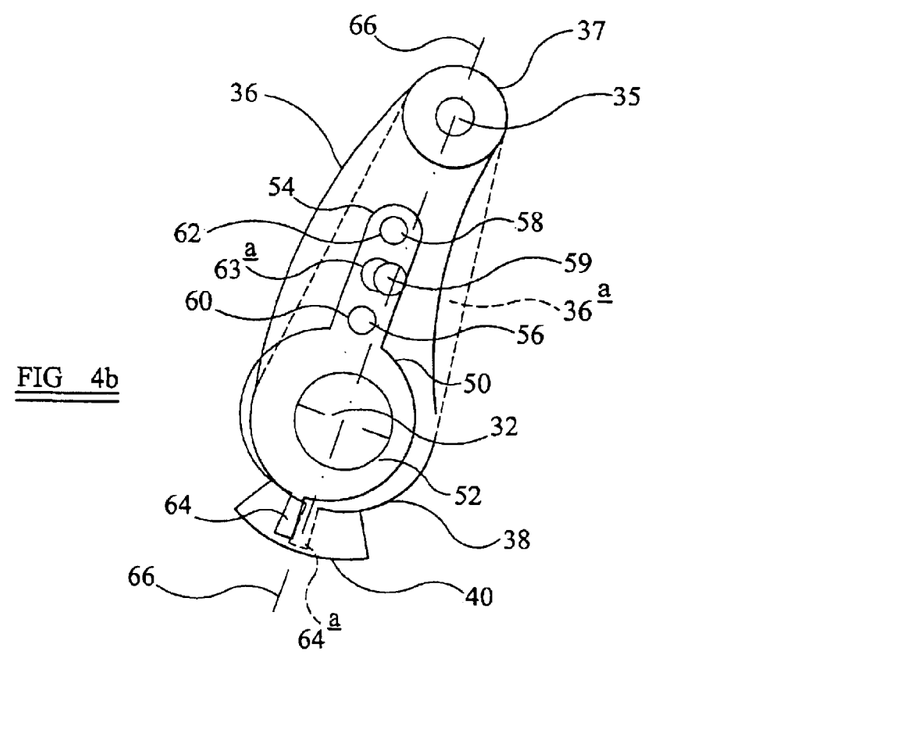

FIG. 4b shows the actuator member 36 and marker device 50 in a position where the actuator member 36 is bending. The ideal, stiff (i.e. unbent) condition of actuator member 36 is shown by the broken lines 36a.

As seen in FIG. 4b, when the actuator member 36 bends, the pins 56, 58 are no longer aligned along the axis 66. Because the marker device 50 is pinned through holes 60, 62 to the actuator member 36 at the positions of the two dowel pins 56, 58, it is not subjected to bending. The annular portion 52 is therefore displaced relative to the drive end 38 of the actuator member 36. The end portion 64 thus indicates a position closer to that resulting from an unbent (as 64a in FIG. 4b) actuator member 36, and closer to the correct position of the nozzle, than the position indicated by the wiper 44 of FIG. 3b.

If the dowel pins' respective longitudinal axes were to pass through the pivot point 32 defining the centre of rotation of the drive end 38, and the centre of the pinned coupling 35 at the opposite end 37, then the end portion 64 would not be displaced relative to the axis 66 of the undeformed actuator member 36a, and the position sensor 40 would accurately indicate the change in position of the centre of the pinned coupling 35, and thus more accurately reflect the change in position of the nozzle 30.

Resistance to movement of the nozzle 16 causes the actuator member 36 to bend, the translation of the pins 56, 58 causes the marker device 50 to be displaced relative to the axis 66. The pins 56, 58 may be suitably disposed so as to result in a true indication of the position of the nozzle 16, compensating for deformations in other actuator components, for example the link 34, resulting in a more accurate indication of nozzle position.

The marker device 50 can thus compensate for deformation of the actuator member 36 and other actuator components so that the position sensor 40 provides a more accurate feedback signal which may be used in closed loop control of the actuator.

The compensation of the indicated position is a means of providing an apparent high stiffness of the actuator components. Therefore, components having a relatively low stiffness (for example lighter weight components), may be used with fewer associated problems caused by errors in actual position compared with demanded position due to component deformations.

It will be appreciated that the exact relationship between the position indicated by the position sensor 40 when the actuator member 36 deforms, and the true position of the nozzle 16 will depend on many factors including the location of the pins 56, 58, the shape and material properties (e.g. flexural stiffness) of the actuator member 36, and the precise mode of deformation, which may be bending or may, for example, include one or a combination of any of bending and elastic tension, compression and shearing. Suitable dispositions of the dowel pins 56, 58 relative to the actuator member 36 may be determined empirically for a given actuator assembly, or may be predicted with the aid of design methods such as stress analysis.

It will be appreciated that means other than the dowel pins 56, 58, may be used for securing the marker device to the actuator member 36, and that the location of the securing means does not have to be selected to be in alignment with the longitudinal axis 66.

Figure 5:
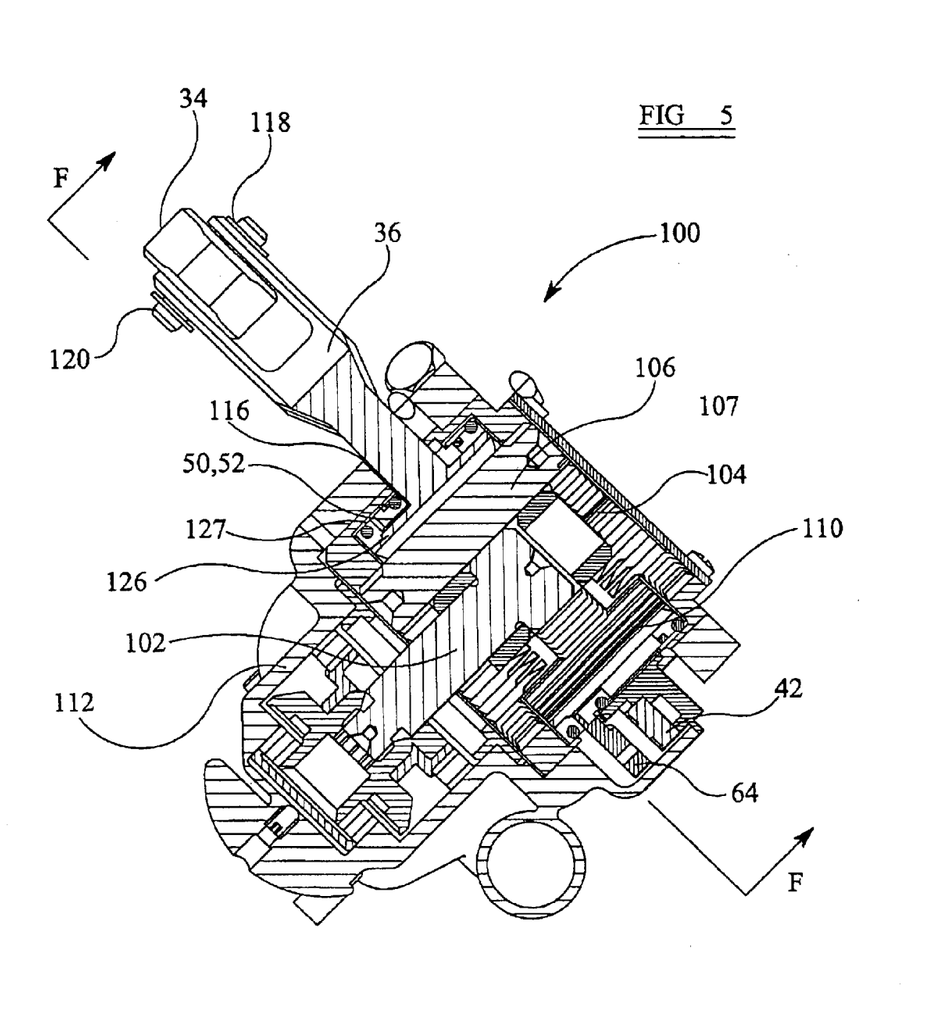
FIG. 5 is a sectional side view of part of the actuator arrangement of FIGS. 4a and 4b.

FIG. 5, wherein corresponding reference numerals refer to equivalent components in FIGS. 2 to 4, shows part of the actuator apparatus, shown generally as 100. A drive shaft 102, driven, in use, by a motor (not shown) carries a toothed gear 104 that cooperates with an arrangement of gears 106. Gear arrangement 106 comprises planet gear wheels 107 that mesh with internal teeth 108 of an annular gear wheel 110. Gear arrangement 106 is housed within a housing 112. Annular gear wheel 110 forms part of an actuator member 36 in the form of an annulus arm. Actuator member 36 extends through an opening 116 in the housing 112. A distal portion 118 of the actuator member 36, external of the housing 112, is connected by means of a pinned joint 120 to link member 34. Link member 34 is in turn connected to a nozzle (not shown).

Annular portion 52 of marker device 50, located within the housing 112, is disposed around the shaft 102 and gear arrangement 106. A first annular gap 126 separates the annular portion 52 from the gear arrangement 106. A second annular gap 127 separates the annular portion 52 from the housing 112. The end portion 64 of the marker device 50 engages a wiper of a position sensor potentiometer 40 for providing a signal indicative of a compensated position.

Figure 6:
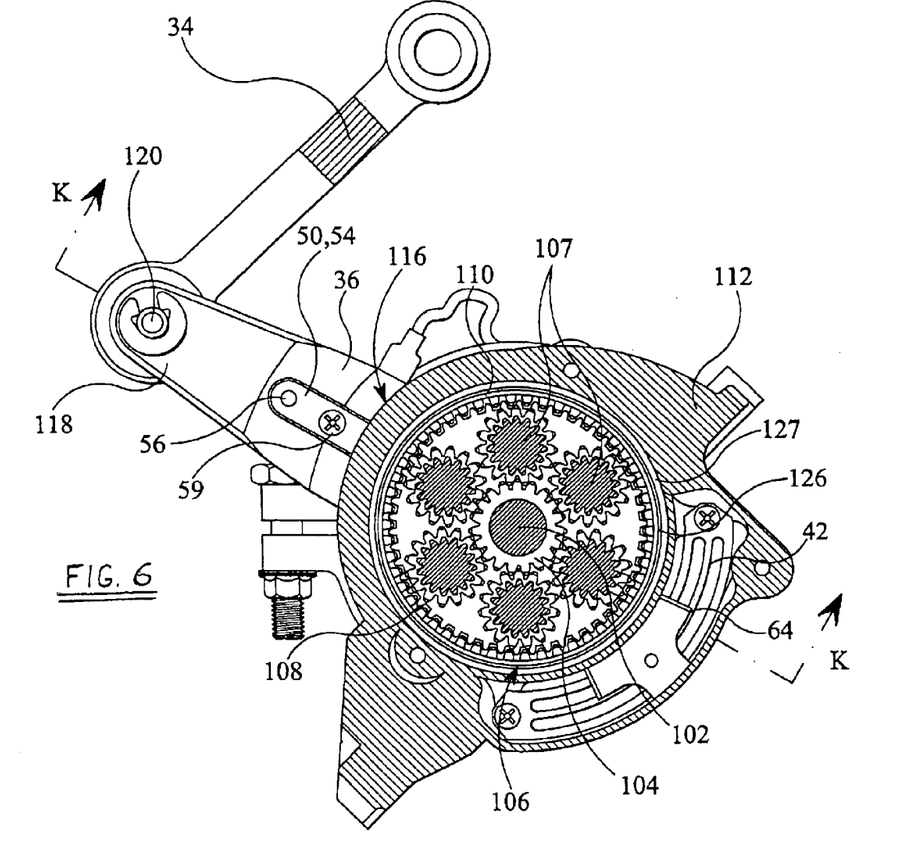
FIG. 6 shows a sectional elevation on a section F—F shown in FIG. 5.
Figure 7:
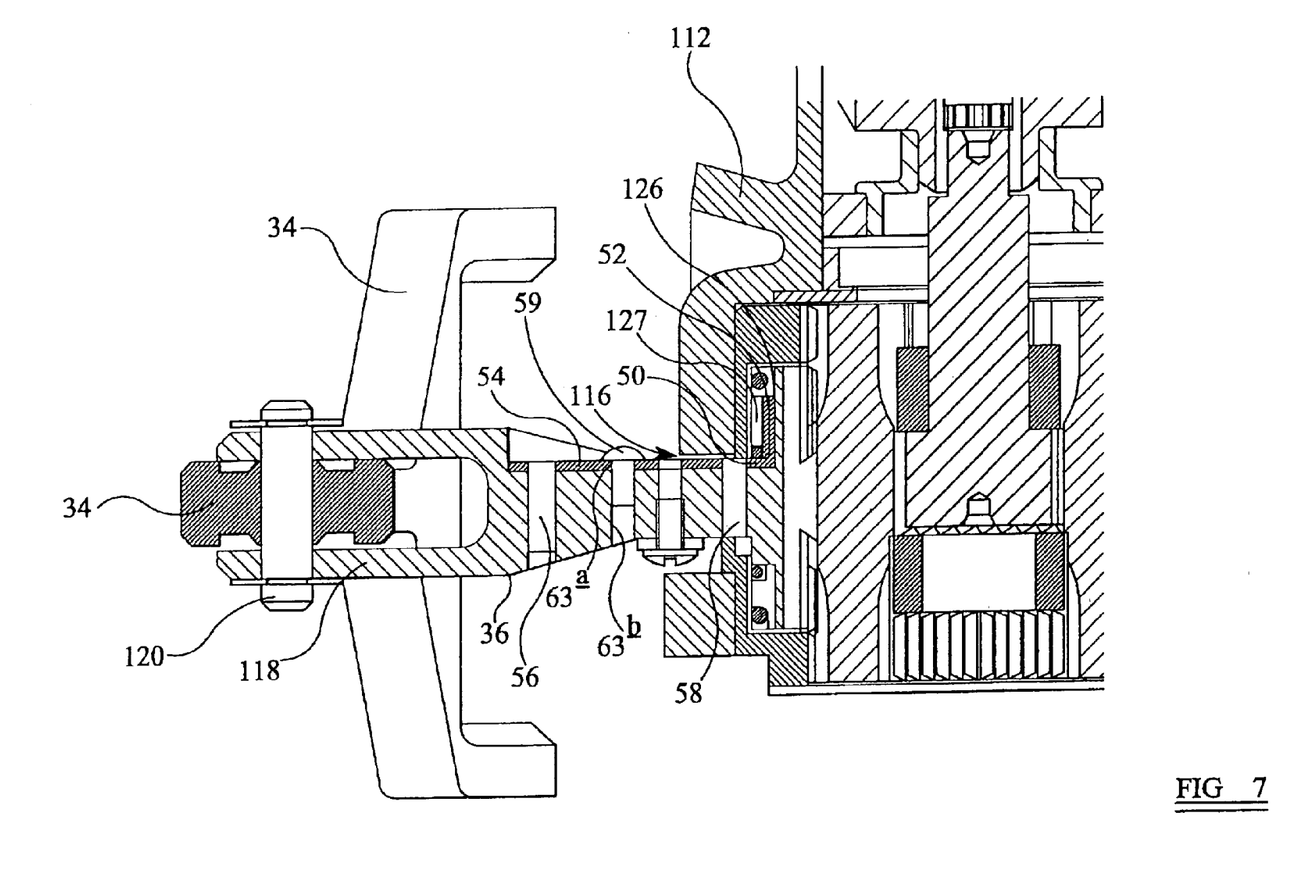
FIG. 7 shows an enlarged detail on a section K—K shown in FIG. 6.

FIG. 6 shows a view of the actuator apparatus on the section F—F of FIG. 5. The marker device 50 has an extended portion 54 that extends through the opening 116 in the housing 112. The marker device 50 is secured to the actuator member 36 by means of pins 56, 58. Pin 58 is not shown in the view of FIG. 6 as it is obscured by part of the housing 112, but is shown in FIG. 7. A screw 59 holds the marker device 50 in position on the actuator arm 36 and pins 56, 58.

FIG. 7 shows an enlarged detail on section K—K of FIG. 6. The elongate portion 54 of marker device 50 is shown located by the pins 56, 58 and held in place by the screw 59 on the actuator arm 36. Also more clearly shown in FIG. 7 are the annular gaps 126, 127 either side of the annular portion 52 of the marker device 50.

In use, a rotary drive applied to the drive shaft 102 transmits torque through the gear arrangement 106 to the actuator arm 36. The torque applied drives the actuator arm 36 in rotation around the axis of drive shaft 102 so as to transmit motion to the link arm 34 to effect a change in position of the nozzle (not shown). The change in position of the nozzle, resulting from an angular change in position of the actuator arm 36 causes the marker 64 to move with respect to the potentiometer track 42 so as to provide a signal of the sensed change in position of the nozzle.

A resistance to movement of the nozzle causes a resistance to the applied torque causing the actuator arm 36 to bend. As described above, bending of the actuator arm 36 causes a lateral translation of the pins 56, 58 and of the marker device 50. The annular portion 52 of the marker device 50 is free to move due to the annular gaps 126, 127 separating it from the gear arrangement 106 and housing 112. The lateral translation of the marker device 50 causes an adjustment to the position of the wiper 64 with respect to the track 42 of the potentiometer. This adjustment results in a signal of the sensed change in position of the nozzle that compensates for the bending of the actuator arm 36.

By a suitable choice of fixing locations of the pins 56, 58, the marker device 50 may also be used to compensate for lost motion in the actuation system, for example in mechanical components linking the actuator arm 36 to the nozzle.

What is claimed is:

1. An actuator apparatus comprising an actuator member, an actuated element movable by actuation of said actuator member, and a marker device including a marker the position of which can be sensed in use by sensor means, said marker device being secured to said actuator member such that deformation of the actuator member during actuation to move said element causes an adjustment to the change in position of the marker.

2. Apparatus as claimed in claim 1 wherein said actuator member comprises an actuator arm having a longitudinal axis, the marker device being secured to the actuator member such that deformation of the actuator arm causes a displacement of the marker device laterally of the longitudinal axis of the actuator arm.

3. Apparatus as claimed in claim 1 including sensor means for sensing the change in position of said marker.

4. Apparatus as claimed in claim 3 wherein said sensor means includes indicator means for providing an indication of a change of position of said marker.

5. Apparatus as claimed in claim 1 wherein said marker device is secured to said actuator member such that said adjustment to the change in position of the marker compensates for the deformation of the actuator member and also for deformation of other members of the apparatus.

6. Apparatus as claimed in claim 3 wherein said sensor means comprises a potentiometer and the marker is drivingly connected to a wiper of the potentiometer.

* * * * *